United States Patent [19]

Fitzgerald

[11] 4,386,966
[45] Jun. 7, 1983

[54] COPPER PHTHALOCYANINE PIGMENT PROCESS

[75] Inventor: Patrick H. Fitzgerald, Pitman, N.J.

[73] Assignee: E. I. Du Pont de Nemours and Company, Wilmington, Del.

[21] Appl. No.: 330,333

[22] Filed: Dec. 14, 1981

[51] Int. Cl.$^3$ ............................................. C09B 47/04
[52] U.S. Cl. ................................. 106/288 Q; 106/309
[58] Field of Search .......................... 106/288 Q, 309; 260/314.5

[56] References Cited

U.S. PATENT DOCUMENTS

| | | | |
|---|---|---|---|
| 2,799,594 | 7/1957 | Ehrich | 106/288 |
| 2,799,595 | 7/1957 | Kudzin | 106/288 |
| 3,024,247 | 3/1962 | Moser et al. | 260/314.5 |
| 4,289,698 | 9/1981 | Stepp | 260/314.5 |

OTHER PUBLICATIONS

B. Honigmann et al., Zeitschrift fur Kristallographic, 122, pp. 185-205 (1965).
B. Honigmann, Berichte der Bundesgesellschaft Für Physikalische Chemie, 71 (1967).

*Primary Examiner*—James Poer

[57] ABSTRACT

Premilled semichloro copper phthalocyanine or partially sulfonated semichloro copper phthalocyanine is slurried and stirred with sulfuric acid (50–60% and preferably 55–59% in the case of semichloro copper phthalocyanine and 50–61% and preferably 58–61% in the case of partially sulfonated semichloro copper phthalocyanine) at 50°–85° C., preferably 65°–75° C. for ½ to 4 hours. The slurry is diluted with to less than 35% sulfuric acid concentration and stirred at 60°–95° C. for ½ to 4 hours. The resulting highly transparent pigment is filtered and dried.

9 Claims, No Drawings

COPPER PHTHALOCYANINE PIGMENT PROCESS

BACKGROUND OF THE INVENTION

The present invention relates to a process for converting crude semichlorinated copper phthalocyanine or crude partially sulfonated semichlorinated copper phthalocyanine into a highly transparent pigment of high tinctorial strength.

In the past crude copper phthalocyanine has been converted to pigmentary grade material by solvent milling as disclosed in U.S. Pat. Nos. 2,799,594 and 2,799,595 or by acid pasting as disclosed in 3,024,247. The products produced in this manner do not exhibit high transparency, and encapsulation in polymers, such as disclosed in U.S. Pat. No. 3,806,464, has been used to improve transparency. The process of the present invention involves an acid treatment of a preground semichlorinated copper phthalocyanine pigment, which is lower in cost than either acid pasting or solvent milling and produces highly transparent products without the complication of added polymeric resins.

The effect of contact with sulfuric acid solutions of various concentrations on the crystal phase of copper phthalocyanine and monochloro copper phthalocyanine has been described by B. Honigmann et al Zeitschrift fur Kristallographic 122, pp 185-205 (1965) and B. Honigmann, Berichte der Bundesgesellschaft, 71 (1967).

SUMMARY OF THE INVENTION

The present invention relates to a process for preparing highly transparent semichloro copper phthalocyanine or partially sulfonated semichloro copper phthalocyanine in which the crude pigment is preground and then contacted with partially diluted sulfuric acid at an elevated temperature to form a slurry. The slurry is then diluted with water to less than 35% sulfuric acid in water concentration and stirred at an elevated temperature. The pigment is then isolated in the conventional manner.

DETAILED DESCRIPTION

The premilling step of the present invention is that conventionally use for ball milling operations. Thus the charge of grinding media will occupy about half of the volume of the mill and the copper phthalocyanine being ground to essentially occupy the voids between these media. It is quite possible to increase the charge with some increase in milling time. The choice of these conditions is well within the skill of one versed in this type of operation. The preferred grinding media in the mill is the rod type, which may vary in size; but it is quite possible to use ordinary round steel balls varying from ⅛ inch (0.32 cm) in diameter up to ½ inch (1.27 cm) in diameter or more in the operation. When round balls are used there is a marked tendency for the charge to cake in the mill, under some conditions, which tendency generally can be avoided by the addition of materials of an irregular shape, such as nails, to the charge. The use of the rod type grinding media usually avoids this caking.

For use in the present invention ball milling is preferred over sand milling or salt milling.

It is impossible to set up limits as to the length of the milling cycle, since it will vary with the mill loading and the type of mill being used. In order to establish the optimum length of time for the milling, it is recommended that the invention be run with variations in the milling time and the samples evauluated for the best balance of properties such as color strength, intensity, dispersibility and transparency. A minimum of 4-6 hours is usually required, and this may be extended to as much as 12-18 hours or even more on a commercial scale mill. Considerably longer times are required when using a semi-works or laboratory scale mill.

After the premilling step the pigment is in the form of a highly agglomerated material of low crystallinity which is of little value as a pigment.

In accordance with the present invention after the premilling step the premilled semichloro copper phthalocyanine is contacted with aqueous sulfuric acid. In the case of semichloro copper phthalocyanine the sulfuric acid concentration should be from 50 to 60% by weight and preferably from 55 to 59% by weight. In the case of partially sulfonated semichloro copper phthalocyanine the sulfuric acid concentration should be from 50 to 61% by weight with from 58 to 61% by weight being preferred. If an acid concentration below 50% is used the premilled powder is not sufficiently deaggregated and a weak, dull product with a milky scatter in metallic finishes will result. If acid greater than 60% (61% in the case of partially sulfonated semichloro copper phthalocyanine) is used the product will have the less desirable greener weaker $\alpha$II phase and will be less transparent.

The weight ratio of sulfuric acid solution to premilled pigment preferably is 4.5-5.5 to 1. At lower levels the pigment is moderately wet and does not give a stirrable mass. Larger amounts of sulfuric acid can be used but are undesirable for economic reasons. The acid is at an elevated temperature when added to the pigment. The resulting slurry is stirred at 50° to 85° C. for from ½ to 4 hours. This slurry is then diluted to less than 35wt % sulfuric acid in the aqueous phase and stirred at 60° to 95° C. for ½ to 4 hours. The pigment is then isolated in the conventional manner, such as by filtering and drying. Surfactants and/or other treating agents may be added during either stage of the process.

As used herein semichloro copper phthalocyanine means copper phthalocyanine containing from 3 to 5 percent by weight chlorine. As used herein partially sulfonated semichloro copper phthalocyanine means semichloro copper phthalocyanine in which up to 15% of the semichloro copper phthalocyanine molecules contain a sulfonic group derived from 4-sulfophthalic anhydride or 4-sulfophthalic acid during synthesis of the semichloro copper phthalocyanine.

The products of the present invention are exceptionally transparent in automotive acrylic lacquers and enamels. This is especially important in the case of automotive enamels and lacquers based upon solvent solutions of acrylic polymers and containing metal particles, i.e., aluminum flake, to provide a metallized or "polychromatic" finish. These finishes provide rich, glamorous, decorative effects due to their apparent enhancement of curvature. The phenomenon is known as geometric metamerism, but more commonly is referred to in the automotive industry as "two-tone" effect or "flip-flop." It is observable as a change in color depth, and often hue, as a function of viewing angle. This is apparent on an automobile by comparing the appearance of different body contours. On a flat surface, the effect may be observed by slowly rotating a paint panel from a normal to an obtuse angle. The color should increase in depth as the viewing angle changes in any direction from the normal. In any case the effect, which is caused by specular reflection of the flake pigment, is diminished if the colored pigment scatters light diffusely. The so-called "transparent" pigments, then, are those which are free from particles large enough to cause diffuse scattering. To be suitably transparent an organic pigment should generally have crystallite sizes less than 0.1μ and should resist particle agglomeration during the various phases of pigment manufacture and during formation of the finish itself.

EXAMPLES

In the following examples all "parts" are by weight.

EXAMPLE I—PREPARATION OF THE MILL POWDERS

Forty-eight parts of the crude copper phthalocyanine (as described in a or b below) was rolled at 70% of critical speed (critical speed is the speed at which centrifugal force overcomes the force of gravity so that the grinding elements are retained against the outer wall of the mill) with 1000 parts of ⅝" (1.6 cm)×1" (2.54 cm) steel rods for 6 hours and discharged through a screen.

a. The crude copper phthalocyanine used for the milling contained about 4.0% chlorine as obtained by isolating the product of the reaction 4-chlorophthalic acid and phthalic anhydride with urea and copper chloride in kerosene and in the presence of ammonium molybate.

b. The crude copper phthalocyanine used for the milling contained about 4.0% chlorine and 0.27% sulfur as obtained by isolating the product of the reaction of 4-chlorophthalic acid, 4-sulfophthalic acid and phthalic anhydride with urea and copper chloride in kerosene and in the presence of ammonium molybdate.

EXAMPLE II

To a solution of 6 parts dicocodimethylammonium chloride and 285 parts 96% sulfuric acid in 179 parts water at 70° C. is added 100 parts of the mill powder from Example 1a. The slurry is stirred at 70±2° C. for 2 hours. Then the slurry is diluted with 958 parts water and is stirred at 92°–94° C. for 2 hours. Then the pigment is isolated by filtration, water washing at 50° C. and drying at 80° C. in the normal manner. The product is a dark red shade blue pigment which is strong and intense when compared to that prepared by a conventional solvent method.

EXAMPLE III

The process is identical to that of Example II, except that after 1½ hours of stirring at 92°–94° C., the slurry is cooled to below 85° C. and a solution of 5.3 parts of CPC-monosulfonic acid in 66 parts of 96% sulfuric acid is added. Then the slurry is stirred a further ½ hr. at 92°–94° C. and the product isolated as in Example II. The product is strong, intense and has superior rheological properties in acrylic enamels when compared to products from a conventional acetone milling process.

EXAMPLE IV

To a solution of 291 parts of 96% $H_2SO_4$ in 182 parts of water at 68°–72° C. is added 100 parts of mill powder from Example I-b. The slurry is stirred at 68°–72° C. for 1½ hours and then is diluted with 820 parts water and stirred at 70°–75° C. for 1½ hours. The pigment is then isolated as in Example II in the normal manner. The product is strong, intense and very transparent in acrylic dispersion lacquer. It gives better rheological properties and gasoline resistance in lacquer systems than polymer encapsulated pigment such as prepared by the process of U.S. Pat. No. 3,806,464 while providing equal or better "flip-flop." The remaining examples are to illustrate the process limits.

EXAMPLE V

Three solutions of 287.5 parts of 96% sulfuric acid in 188 parts water were prepared and brought to temperature.
a. to 24°–28° C.
b. to 48°–52° C.
c. to 68°–72° C.

To each was added 100 parts of the mill powder from I-a and each was stirred 1½ hours at temperature. Then each was diluted with 860 parts water and heated to 92°–94° C. and stirred for 1½ hours. The products were isolated as in Example II. The product of V-a was very weak, dull, and opaque compared to that of V-b. The product of V-b was very weak, dull, and opaque compared to that of V-c.

EXAMPLE VI

The process was run like that in Example V-c, except that the product was isolated as in Example II immediately after dilution, without any heat up or stir period. The product was opaque and very weak to that of V-c.

EXAMPLE VII

To a solution of 291 parts 96% $H_2SO_4$ in 1000 parts water (21.7% acid) was added 100 parts of the mill powder from I-a. The slurry was heated to 92°–94° C. and stirred for 1½ hours. Then the product was isolated as in Example II.

The product was extremely dull and opaque and extremely weak to that of Example V-c.

I claim:

1. A process comprising premilling a crude semichloro copper phthalocyanine or a crude partially sulfonated semichloro copper phthalocyanine, forming a slurry of the premilled material in an aqueous solution of sulfuric acid of 50 to 60 percent by weight strength in the case of semichloro copper phthalocyanine or of 50 to 61 percent by weight strength in the case of partially sulfonated semichloro copper phthalocyanine, stirring the slurry while maintaining its temperature at from 50° to 85° C. for from ½ to 4 hours, diluting the slurry with water to less than 35 weight percent sulfuric acid in water, stirring the diluted slurry at from 60° to 95° C. for from ½ to 4 hours and recovering pigmentary grade semichloro copper phthalocyanine or partially sulfonated semichloro copper phthalocyanine.

2. The process of claim 1 wherein semichloro copper phthalocyanine is being treated.

3. The process of claim 2 wherein the aqueous slurry is formed using from 55 to 59 percent by weight sulfuric acid.

4. The process of claim 3 wherein the initial sulfuric acid slurry is maintained at from 65° to 75° C.

5. The process of claim 4 wherein the weight ratio of aqueous solution of sulfuric acid to semichloro phthalocyanine in the initial slurry is from 4.5 to 5.1/1.

6. The process of claim 1 wherein partially sulfonated semichloro copper phthalocyanine is being treated.

7. The process of claim 6 wherein the aqueous slurry is formed using from 58 to 61 percent by weight sulfuric acid.

8. The process of claim 7 wherein the initial sulfuric acid slurry is maintained at 65° to 75° C.

9. The process of claim 8 wherein the weight ratio of sulfuric acid to partially sulfonated semichloro copper phthalocyanine is from 4.5 to 5.5/1.

* * * * *

UNITED STATES PATENT OFFICE
CERTIFICATE OF CORRECTION

PATENT NO. : 4,386,966
DATED : June 7, 1983
INVENTOR(S) : Patrick Henry Fitzgerald It is certified that error appears in the above-identified patent and that said Letters Patent are hereby corrected as shown below:

In claim 5, line 2, after "semichloro" insert --copper--.

In claim 5, line 3, change "5.1/1" to read --5.5/1--.

In claim 9, line 1, after "of" insert --aqueous solution of--.

Signed and Sealed this

Thirteenth Day of March 1984

[SEAL]

Attest:

GERALD J. MOSSINGHOFF

Attesting Officer    Commissioner of Patents and Trademarks